May 30, 1950 N. I. KORMAN ET AL 2,510,022

BAND PASS SIGNAL TRANSMISSION SYSTEM

Filed March 15, 1944 2 Sheets-Sheet 1

INVENTORS.
Nathaniel I. Korman
& Carl G. Sontheimer
BY C. D. Tuska
ATTORNEY

BAND PASS SIGNAL TRANSMISSION SYSTEM

Filed March 15, 1944 2 Sheets-Sheet 2

INVENTORS
Nathaniel I. Korman
& Carl G. Sontheimer
BY
ATTORNEY

Patented May 30, 1950

2,510,022

UNITED STATES PATENT OFFICE 2,510,022

BAND-PASS SIGNAL TRANSMISSION SYSTEM

Nathaniel I. Korman, Camden, and Carl G. Sontheimer, Haddonfield, N. J., assignors to Radio Corporation of America, a corporation of Delaware Application March 15, 1944, Serial No. 526,846

10 Claims. (Cl. 178—44)

Figure 1:
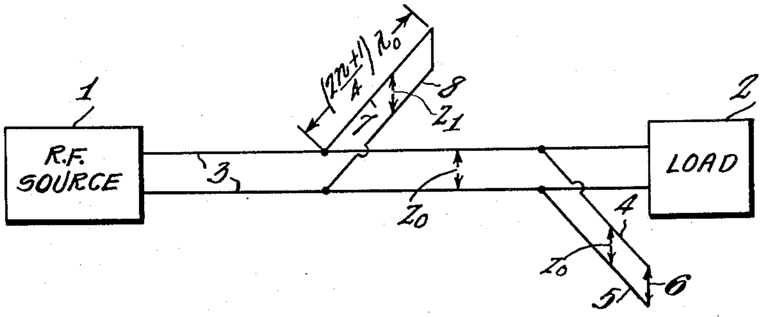

This invention relates generally to signal transmission systems and more particularly to improved methods of and means for matching a load to a signal transmission line at two different operating frequencies.

It is well known that a load connected at the end of a transmission line may be matched by a variety of matching means including shunt reactors, quarter wavelength impedance transformers, etc. In general, when a load is matched to a transmission line by any such means, a perfect match may be realized at only one operating frequency, the degree of mismatch increasing quite rapidly as the operating frequency deviates from the matched frequency.

The instant invention contemplates novel methods of and means for matching a load to a transmission line at a second operating signal frequency of the same order by connecting to the transmission line a resonant device which has substantially no effect upon the load matching at the first matching frequency but which improves the load matching at some other predetermined frequency of the same order. In operation, such a device provides, at the additional matching frequency, wave reflections which are equal in magnitude and opposite in phase to the reflections from the load at such additional frequencies. The transmission characteristics of such a line may be considered as comparable to the characteristics of a bi-resonant circuit.

One such device, providing equal and opposite reflections to those caused by the load, comprises a section of transmission line having a length which is an odd number of quarter wavelengths $$\left(\frac{(2n+1)}{4}\lambda\right)$$

at the original matched frequency; the section of line is shunted across the main transmission line and is short-circuited at its end remote from the main line. It may be shown that the magnitude of the wave reflection coefficient from the load at any frequency $F_1$ which differs from the original line matching frequency $F_0$ by an amount $\Delta F$ is $$R=\frac{1}{\sqrt{1+4z^2\cot^2\frac{\pi}{2}\frac{\Delta F}{F_0}}} \tag{1}$$

Where $z$ is the ratio of the characteristic impedance $z_1$ of the stub line to the characteristic impedance $z_0$ of the main transmission line.

$z$ is chosen so that when $\Delta F=F_1-F_0$; R will equal the magnitude of the reflection from the load. It then may be shown that if the quarter wave stub line is connected to the main transmission line at a distance equal to $$\frac{\lambda_1}{4\pi}\cos^{-1}(-R) \tag{2}$$

from a point of voltage maximum on the main transmission line in the direction of the generator, reflections between the line stub and the load will be cancelled, and a perfect match will be obtained at both the original matched frequency $F_0$ and the additional matched frequency $F_1$.

A second method of accomplishing the match of a load to a transmission line at two operating frequencies utilizes the fact that such matching may be accomplished by making one or more derivatives of the reflection coefficient at the original matching frequency $F_0$ equal to zero. This may be accomplished in practice by the use of any substantially non-dissipative device which of itself causes no reflections at the original matching frequency $F_0$ as, for example, the shunt stub lines of the method described heretofore.

Another practical realization of the invention involves changing a half wavelength (at the original matching frequency $F_0$), section of the main transmission line to a different characteristic impedance than that of the balance of the main transmission line. This arrangement will have no effect upon the line matching at the original matching frequency $F_0$. It can be shown that the derivative of the reflection coefficient of this half wave line section is $$\left.\frac{dr}{d\lambda}\right]_{f_0}=-\frac{\pi}{\lambda_0}\frac{Z_{02}2-Z_{01}^2}{2Z_{01}Z_{02}} \tag{3}$$

where $Z_{01}$ is the characteristic impedance of the original transmission line and $Z_{02}$ is the characteristic of the half-wave-length section of the transmission line which is inserted in series with the main transmission line. In order to realize the desired reflection coefficient, it is necessary to choose $Z_{02}$ so that the derivative of the reflection coefficient of the half wave section of transmission line equals the derivative of the reflection coefficient of the load, and to locate the half wave-length section of line so that reflections cancel at frequencies of the order of the second mentioned frequency $F_1$.

The invention thus generally described may be realized by means of any reactive device resonant at the original line matching frequency $F_0$ whereby the supplemental resonant device connected to the line has no effect upon the original match of the frequency $F_0$. It should be understood that the invention may be applied to equal advantage to transmission line systems employing open lines, coaxial transmission lines or waveguides. Structures adapted to the application of the invention for the various types of signal transmission lines will be described in detail hereinafter by reference to the accompanying drawings.

Among the objects of the invention are to provide an improved method of and means for matching a load to a signal transmission line at two adjacent operating frequencies. Another object of the invention is to provide an improved method of and means for matching a load to a signal transmission line simultaneously at two slightly different signal frequencies. A further object of the invention is to provide an improved method of and means for matching a load to a signal transmission line simultaneously at two closely related operating frequencies by connecting a resonant device to said line to provide equal magnitude and oppositely-phased reflections on said line to those reflections provided by the load at one of said operating frequencies.

Other objects of the invention are to include novel methods of and means for matching a load to a signal transmission line at two operating signal frequencies by tuning said load to said transmission line at one of said frequencies, and by connecting to said line at least one reactive device resonant at said one frequency and providing a reflection of equal magnitude but of opposite phase on said line to those provided by said load at the other operating signal frequency. Another object of the invention is to provide an improved method of and means for matching a load to a coaxial transmission line at two operating signal frequencies. An additional object of the invention is to provide an improved method of and means for matching a load to a waveguide transmission system at two operating signal frequencies.

Figure 2:
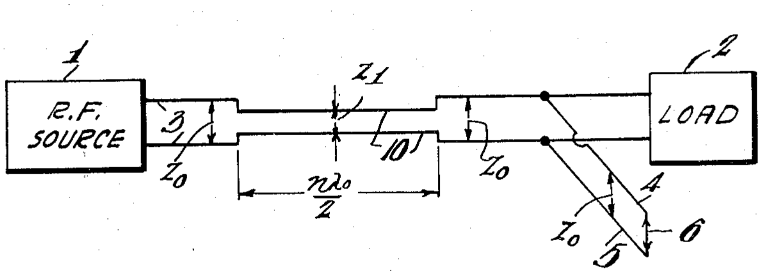
Figure 3:
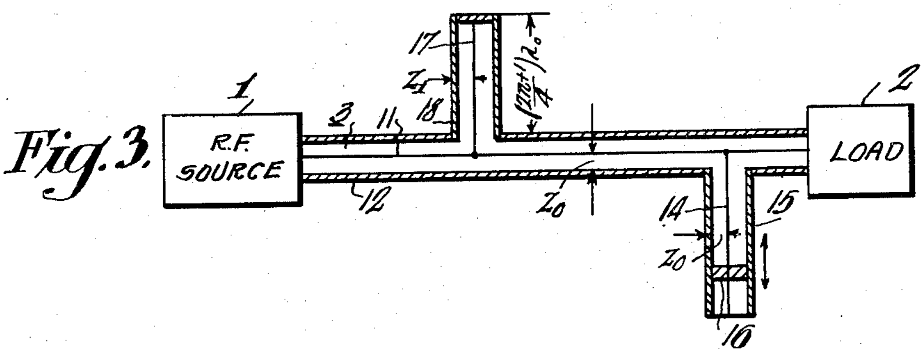
Figures 4, 5:
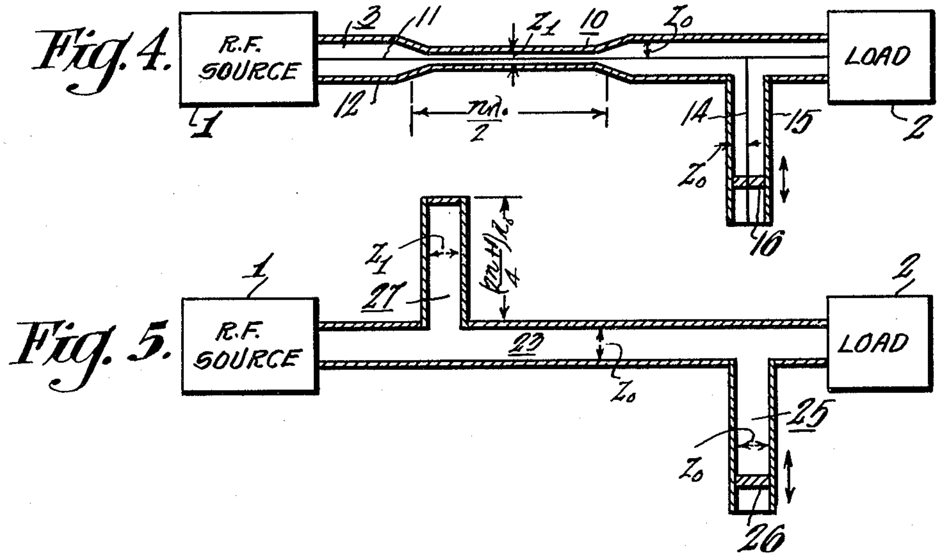
Figure 6:
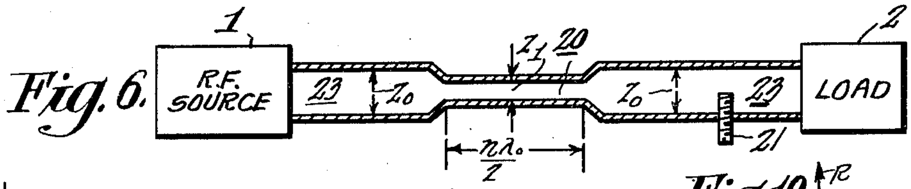
Figure 7:
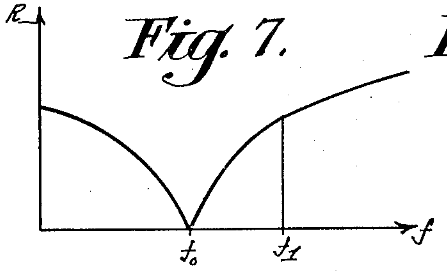
Figures 8, 10:
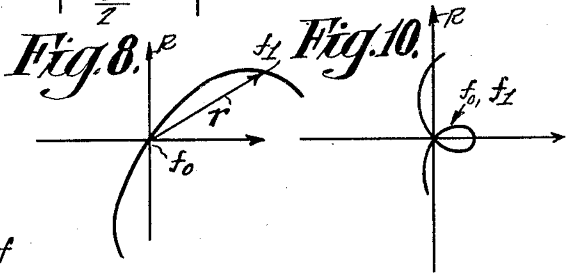
Figure 9:
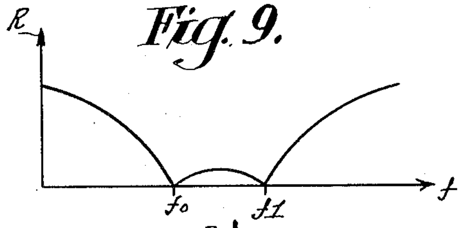
Figure 11:
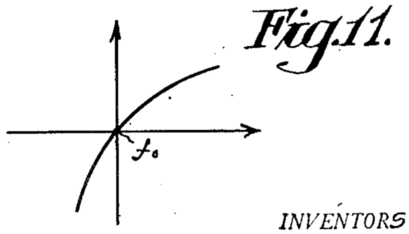
Figure 12:
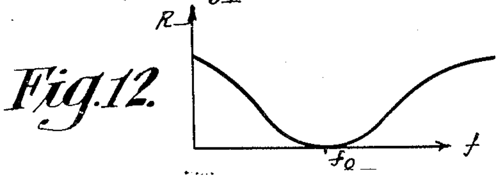

The invention will be described further by reference to the accompanying drawings of which Figure 1 is a schematic circuit diagram of one embodiment of the invention; Figure 2 is a schematic circuit diagram of a second embodiment of the invention; Figure 3 is a schematic circuit diagram of a first modification of the first embodiment of the invention illustrated in Figure 1 adapted to use with coaxial transmission lines; Figure 4 is a schematic circuit diagram of a first modification of the second embodiment of the invention adapted to coaxial transmission lines; Figure 5 is a schematic diagram of a second modification of the first embodiment of the invention for waveguide transmission systems; Figure 6 is a schematic diagram of a second modification of the second embodiment of the invention for waveguide transmission systems; Figures 7 and 8, are graphs illustrating the matching characteristics of a load matched to a transmission line at a single operating frequency; Figures 9 and 10 are graphs illustrating the matching of a load to a transmission line at two operating frequencies and Figures 11 and 12 are graphs illustrating the matching of a load to a transmission line of the type illustrated in Figures 2, 4 and 6. Similar reference characters are applied to similar elements throughout the drawings.

Referring to Figure 1, a source of signal energy 1 is connected to a load 2 by means of a balanced transmission line 3 having a characteristic line impedance $z_0$. The load 2 is matched to the transmission line 3 at a first operating frequency $F_0$ by means of a transmission line stub comprising the conductors 4, 5 each having one end connected to the main transmission line 3 adjacent the load 2. The stub line 4, 5 is tuned by means of a shorting bar 6. The characteristic impedance of the stub line need not be equal to that of the main transmission line characteristic impedance $z_0$.

A second tuning stub comprising the conductors 7, 8, short-circuited at their remote ends, and having a length which is any odd multiple of one quarter wavelength at the first operating frequency $F_0$, or in other words $$\frac{(2n+1)}{4}\lambda_0$$

has a characteristic impedance $z_1$ determined as explained heretofore. The connection of the second quarter-wave tuning stub 7, 8 to the main line conductors 3 is made at a point on the main line 3 which is a predetermined distance in the direction of the signal source 1 from a voltage antinode of the wave reflections from the load 2 at a second adjacent predetermined operating frequency $F_1$.

The point of connection of the second tuning stub, comprising the short-circuited quarter-wave conductors 7, 8, is adjusted along the main transmission line 3 until wave reflections are produced which are equal in magnitude and opposite in phase to wave reflections on the line provided by the load 2 at the second operating frequency. Since the second tuning stub 7, 8 is quarter-wave resonant at the first operating frequency $F_0$, the connection thereof to the main transmission line 3 does not affect the match of the load 2 to the main transmission line at the first operating frequency $F_0$.

In Figure 2 the signal generator 1 is connected to the load 2 through a balanced transmission line 3 having a characteristic impedance $z_0$, and in which is inserted a second section of transmission line 10 having a characteristic impedance $z_1$ and a length corresponding to any integral number of half wavelengths at the first matched frequency $F_0$. As in the circuit of Figure 1, the load 2 connected to one extremity of the main transmission line 3 is matched to the line by means of a tuning stub comprising the conductors 4, 5 and the shorting bar 6. As explained heretofore, the position of the half wave section of transmission line 10, having a characteristic impedance $z_1$, with respect to the other serially-connected portions of the main transmission line 3, having a characteristic impedance $z_0$, is determined in the manner described heretofore, in order to provide wave reflections of equal magnitude and opposite phase at a second operating frequency $F_1$ to the reflections caused on the main transmission line 3 by the load 2 at said second frequency.

Figure 3 is similar in all respects to the circuit of Figure 1 with the exception that the main transmission line 3 comprises a coaxial transmission line having an inner conductor 11 and a coaxially disposed outer conductor 12. Similarly, the tuning stub for matching the load 2 to the coaxial line 3 comprises a coaxial line stub having an inner conductor 14 coaxially disposed within an outer conductor 15 and tuned by an adjustable shorting plug 16.

A second quarter-wave section of coaxial line comprising an inner conductor 17 and an outer conductor 18, shorted at their remote ends, is connected to the main transmission line 3. The location of the second quarter-wave stub 17, 18 is determined as described heretofore with respect to a point of voltage maximum of the wave reflections on the main transmission line 3 provided by the load 2 at a second operating frequency $F_1$. The characteristic impedance $z_1$ of the second quarter-wave line 17, 18 with respect to the characteristic impedance $z_0$ of the main transmission line 3 also is determined as explained heretofore, to provide wave reflections of equal magnitude and opposite phase on the main line 3 to those provided by the load 2 at the second operating frequency $F_1$.

Figure 4 is similar to the circuit of Figure 2 but coaxial transmission lines are substituted throughout for the open balanced lines of the circuit of Figure 2 in the same manner as described heretofore in the circuit of Figure 3.

Figure 5 is similar to the circuits of Figures 1 and 3 but waveguides are substituted for the open balanced lines of the circuit of Figure 1 and for the coaxial lines of the circuit of Figure 3. A main waveguide 23, having a characteristic impedance $z_0$, connects the signal generator 1 to the load 2. The load 2 is tuned to match the waveguide 23 at a first operating frequency $F_0$ by any one of the well known means, such as a tuning stub 25 having a longitudinally adjustable plug 26 disposed therein.

A second quarter-wave resonant waveguide stub 27, having a characteristic impedance $z_1$, provides equal magnitude and oppositely-phased wave reflections in the main transmission waveguide 23 to those provided by the load 2 in the main waveguide 23 at a second operating frequency $F_1$, as described in detail heretofore.

Figure 6 is similar to the circuits of Figures 2 and 4 but waveguides of different characteristic impedance $z_0$ and $z_1$ are substituted for the open balanced lines of the circuit of Figure 2 and for the coaxial lines of the circuit of Figure 4. Matching of the load 2 to the main waveguide 23 at the first operating frequency $F_0$ is accomplished by means of a conventional tuning screw 21 extending within the main waveguide 23 adjacent the load 2.

It should be understood that the load matching means at the first operating frequency $F_0$ illustrated in the devices of Figures 5 and 6 may, if desired, be interchanged or replaced by other types of matching devices since the particular types illustrated and described are disclosed herein merely for the purpose of showing the various types of matching units in common use.

Figure 7 shows the magnitude of the reflection coefficient as a function of frequency on a transmission line wherein the load is matched to the line at only one operating frequency, as is customary in the prior art.

The graph of Figure 8 shows the locus of the complex reflection coefficient as the frequency is varied in transmission lines wherein the load is matched at only one frequency.

Figure 9 shows the magnitude of the reflection coefficient as a function of frequency, and Figure 10 shows the locus of the complex reflection coefficient with respect to frequency, for a transmission line of the type including the novel features of applicants' invention wherein the load is matched to the transmission line at two closely related predetermined operating frequencies $F_0$, $F_1$, thereby providing band-pass operation for the frequency band extending from slightly below the frequency $f_0$ to slightly above the frequency $f_1$.

The graphs of Figures 11 and 12 show, respectively, the locus of the complex reflection coefficient with respect to frequency, and the magnitude of the reflection coefficient as a function of frequency for embodiments of applicants' invention wherein one or more derivatives of the reflection coefficient vanish at the first operating frequency $F_0$, thereby providing band-pass operation for a band of frequencies in the neighborhood of frequency $f_0$.

Thus the invention disclosed comprises several embodiments and modifications of a novel method of and means for matching a load to a signal transmission line at two adjacent predetermined operating frequencies, wherein a quarter-wave line is connected to the main transmission line to provide wave reflections on the main transmission line equal in magnitude and opposite in phase to corresponding wave reflections from the load at the additional signal frequency to that to which the load is initially matched.

We claim as our invention:

1. A transmission line for interconnecting a radio frequency source and a load including first means having substantially the same surge impedance as said line connected to said line for matching said line to said load at a first predetermined frequency and second means having a different surge impedance than said line connected to said line at a predetermined distance from a voltage antinode at a second predetermined frequency thereon to provide wave reflections on said line equal in magnitude and opposite in phase to wave reflections from said load at said second frequency, said second means comprising a second line having a surge impedance bearing a predetermined ratio to the surge impedance of said first line such that at least one of the derivatives with respect to frequency of the reflection coefficient at said first frequency is zero, said first and said second means co-operating to provide band-pass transmission over said line substantially for all frequencies between said first and said second frequencies.

2. A transmission line for interconnecting a radio frequency source and a load including first means having substantially the same surge impedance as said line connected to said line for matching said line to said load at a first predetermined frequency and second means having a different surge impedance than said line serially connected in said line at a predetermined distance from a voltage antinode at a second predetermined frequency thereon to provide wave reflections on said line equal in magnitude and opposite in phase to wave reflections from said load at said second frequency, said second means comprising a second line having a surge impedance bearing a predetermined ratio to the surge impedance of said first line such that at least one of the derivatives with respect to frequency of the reflection coefficient at said first frequency is zero, said first and said second means co-operating to provide band-pass transmission over said line substantially for all frequencies between said first and said second frequencies.

3. A transmission line for interconnecting a radio frequency source and a load including first means having substantially the same surge impedance as said line connected to said line for matching said line to said load at a first predetermined frequency and second means having a substantially different surge impedance than said line connected to said line at a predetermined distance from a voltage antinode thereon at a second predetermined frequency differing slightly from said first frequency to provide wave reflections on said line equal in magnitude and opposite in phase to wave reflections from said load at said second frequency, said second means comprising a second line having an effective electrical length of an odd number of quarter wavelengths at said first frequency and having a surge impedance substantially different than and bearing a predetermined ratio to the surge impedance of said first line such that at least one of the derivatives with respect to frequency of the reflection coefficient at said first frequency is zero, said first and said second means co-operating to provide band-pass transmission over said line substantially for all frequencies between said first and said second frequencies.

4. A transmission line for interconnecting a radio frequency source and a load including first means having substantially the same surge impedance as said line connected to said line for matching said line to said load at a first predetermined frequency and second means having a different surge impedance than said line serially connected in said line at a predetermined distance from a voltage antinode at a second predetermined frequency thereon to provide wave reflections on said line equal in magnitude and opposite in phase to wave reflections from said load at said second frequency, said second means comprising a second line having an effective electrical length of an integral number of one-half wavelengths at said first frequency and having a surge impedance bearing a predetermined ratio to the surge impedance of said first line such that at least one of the derivatives with respect to frequency of the reflection coefficient at said first frequency is zero, said first and said second means cooperating to provide band-pass transmission over said line substantially for all frequencies between said first and said second frequencies.

5. A transmission line for interconnecting a radio frequency source and a load including first variable reactive means connected to said line for matching said line to said load at a first predetermined frequency and second means having a different surge impedance than said line connected to said line at a predetermined distance from a voltage antinode at a second predetermined frequency thereon to provide wave reflections on said line equal in magnitude and opposite in phase to wave reflections from said load at said second frequency, the ratio of the surge impedances of said second means and said line being such that at least one of the derivatives with respect to frequency of the reflection coefficient at said first frequency is zero, said first and said second means cooperating to provide band-pass transmission over said line substantially for all frequencies between said first and said second frequencies.

6. A transmission line for interconnecting a radio frequency source and a load including first variable reactive means connected to said line for matching said line to said load at a first predetermined frequency and second means having a different surge impedance than said line serially connected to said line at a predetermined distance from a voltage antinode at a second predetermined frequency thereon to provide wave reflections on said line equal in magnitude and opposite in phase to wave reflections from said load at said second frequency, the ratio of the surge impedances of said second means and said line being such that at least one of the derivatives with respect to frequency of the reflection coefficient at said first frequency is zero, said first and said second means cooperating to provide band-pass transmission over said line substantially for all frequencies between said first and said second frequencies.

7. A coaxial transmission line for interconnecting a radio frequency source and a load including first means having substantially the same surge impedance as said line connected to said line for matching said line to said load at a first predetermined frequency and second coaxial means having a different surge impedance than said line connected to said line at a predetermined distance from a voltage antinode at a second predetermined frequency thereon to provide wave reflections on said line equal in magnitude and opposite in phase to wave reflections from said load at said second frequency, said second means comprising a second coaxial line having an effective electrical length of an odd number of quarter wavelengths at said first frequency and having a surge impedance bearing a predetermined ratio to the surge impedance of said first line such that at least one of the derivatives with respect to frequency of the reflection coefficient at said first frequency is zero, said first and said second means cooperating to provide band-pass transmission over said line substantially for all frequencies between said first and said second frequencies.

8. A wave guide transmission line for interconnecting a radio frequency source and a load including first means having substantially the same surge impedance as said line connected to said line for matching said line to said load at a first predetermined frequency and second waveguide means having a different surge impedance than said line connected to said line at a predetermined distance from a voltage antinode at a second predetermined frequency thereon to provide wave reflections on said line equal in magnitude and opposite in phase to wave reflections from said load at said second frequency, said second means comprising a second waveguide line having an effective electrical length of an odd number of quarter wavelengths at said first frequency and having a surge impedance bearing a predetermined ratio to the surge impedance of said first line such that at least one of the derivatives with respect to frequency of the reflection coefficient at said first frequency is zero, said first and said second means cooperating to provide band-pass transmission over said line substantially for all frequencies between said first and said second frequencies.

9. A coaxial transmission line for interconnecting a radio frequency source and a load including first means having substantially the same surge impedance as said line connected to said line for matching said line to said load at a first predetermined frequency and second coaxial means having a different surge impedance than said line serially connected in said line at a predetermined distance from a voltage antinode at a second predetermined frequency thereon to provide wave reflections on said line equal in magnitude and opposite in phase to wave reflections from said load at said second frequency, said second means comprising a second coaxial line having an effective electrical length of an integral number of one-half wavelengths at said first frequency and having a surge impedance bearing a predetermined ratio to the surge impedance of said first line such that at least one of the derivatives with respect to frequency of the reflection coefficient at said first frequency is zero, said first and said second means cooperating to provide band-pass transmission over said line substantially for all frequencies between said first and said second frequencies.

10. A waveguide transmission line for interconnecting a radio frequency source and a load including first means having substantially the same surge impedance as said line connected to said line for matching said line to said load at a first predetermined frequency and second waveguide means having a different surge impedance than said line serially connected in said line at a predetermined distance from a voltage antinode at a second predetermined frequency thereto to provide wave reflections on said line equal in magnitude and opposite in phase to wave reflections from said load at said second frequency, said second means comprising a second waveguide line having an effective electrical length of an integral number of one-half wavelengths at said first frequency and having a surge impedance bearing a predetermined ratio to the surge impedance of said first line such that at least one of the derivatives with respect to frequency of the reflection coefficient at said first frequency is zero, said first and said second means cooperating to provide band-pass transmission over said line substantially for all frequencies between said first and said second frequencies.

NATHANIEL I. KORMAN.
CARL G. SONTHEIMER.

REFERENCES CITED

The following references are of record in the file of this patent:

UNITED STATES PATENTS

| Number | Name | Date |
|---|---|---|
| 2,238,438 | Alford | Apr. 15, 1941 |

FOREIGN PATENTS

| Number | Country | Date |
|---|---|---|
| 478,211 | Great Britain | Jan. 13, 1938 |